Aug. 30, 1927.

R. T. MUNN

RIM TOOL

Re. 16,726

Original Filed Feb. 4, 1926

Inventor,
Ralph T. Munn;
By A. B. Upham,
Attorney.

Reissued Aug. 30, 1927.

Re. 16,726

UNITED STATES PATENT OFFICE.

RALPH T. MUNN, OF MELROSE HIGHLANDS, MASSACHUSETTS.

RIM TOOL.

Original No. 1,600,695, dated September 21, 1926, Serial No. 85,918, filed February 4, 1926. Application for reissue filed October 9, 1926. Serial No. 140,666.

The object of this invention is the construction of an improved tool by means of which a split rim having attached lugs can be contracted and expanded to permit of the removal from and application to it of a pneumatic tire.

In the larger number of automobile wheels, these rims have four lugs each formed with a bolt hole by means of which the rim is fastened to the felly of the wheel.

In carrying my invention into effect, I provide two rods united by mechanism for forcibly moving them toward and from each other, one rod having a single laterally projecting finger, and the other two spaced fingers, whereby two diametrically opposite lugs of the rim can be engaged by the farthest apart of the three fingers, and two lugs a quadrant apart can be engaged by the two more closely disposed fingers.

Figure 1:
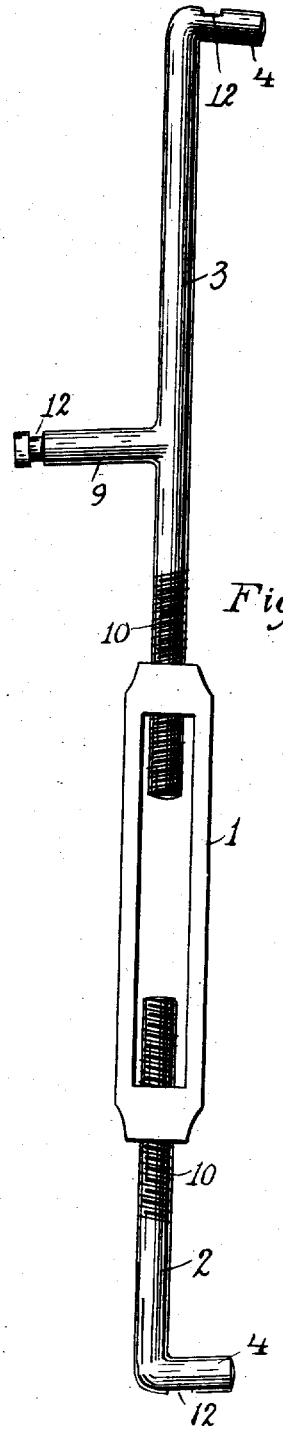
Figure 2:
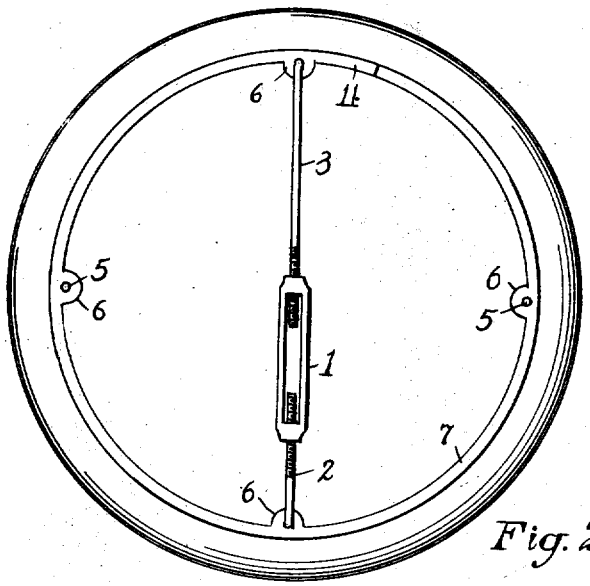
Figure 3:
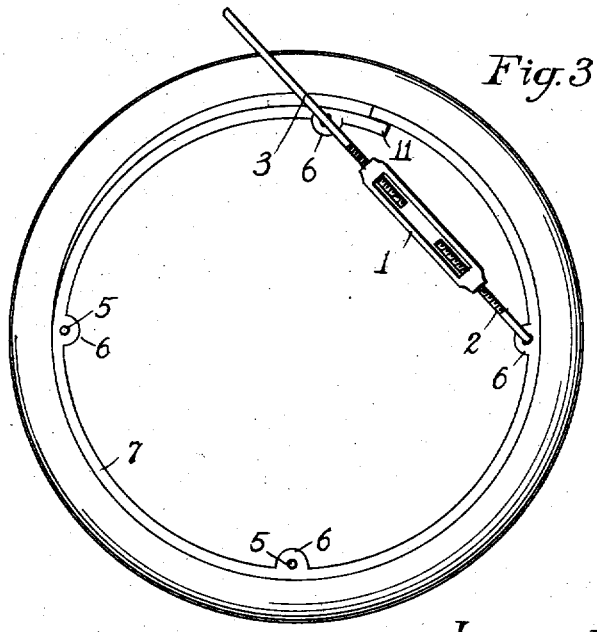

In the drawings forming part of this specification, Fig. 1 is a side view of a rim tool embodying my improvement. Fig. 2 illustrates the same applied to a split rim in diametrically opposite lugs. Fig. 3 shows the tool applied to two nearer lugs.

In the showing in Fig. 1, a turn buckle 1 receives two oppositely threaded rods 2 and 3, each having a finger projecting from its outer end at right angles thereto and adapted to enter a bolt hole 5 in a lug 6 of the split rim 7. The rod 3 is considerably longer than the other and has at an intermediate point thereof a second laterally projecting finger 9.

The threads 10 on the two rods 2, 3 are not only opposite in pitch, but I prefer to have them doubled in order that the rotation of the turn buckle shall be able to force them longitudinally more rapidly.

In using this rim tool, its fingers 4 are inserted in the holes 5 of two diametrically opposite lugs 6, as shown in Fig. 2, and then the turn buckle 1 is rotated until the end of split rim close to the lug is pulled inward and made to overlap the other. The tool is next disengaged from the lugs opposite that adjacent the split, and swung over to put its finger 9 into the lug a quadrant away, and the turn buckle rotated to make the rim-ends overlap far enough to give a sufficient contraction to the rim to permit of an easy removal of the tire. When this has been done and a new tire slipped on over the shrunk rim, the turn buckle 1 is forced in an opposite direction until the overlapping ends are brought to their normal position.

To keep the fingers 4 and 9 from slipping out from the lugs during contraction and expansion of the rim, they are formed with notches 12 which, by their engagement with the edges of the bolt holes 5, provide the desired security.

While I have described the rods as longitudinally forced toward and from each other by means of a turn buckle 1, I do not restrict myself thereto, inasmuch as there are other well known mechanical expedients for performing the same function, although not so perfectly as is accomplished by the turn buckle.

What I claim as my invention is:

A rim tool comprising two rods in alinement having means for longitudinally moving them relative to each other, one rod having a single finger projecting laterally therefrom, and the other rod having two spaced fingers projecting laterally therefrom, whereby the single finger can be engaged with the lug at a terminal of a split rim, and, without removing it therefrom, will permit the other fingers to be separately engaged with widely separated lugs of the rim.

RALPH T. MUNN.